UNITED STATES PATENT OFFICE.

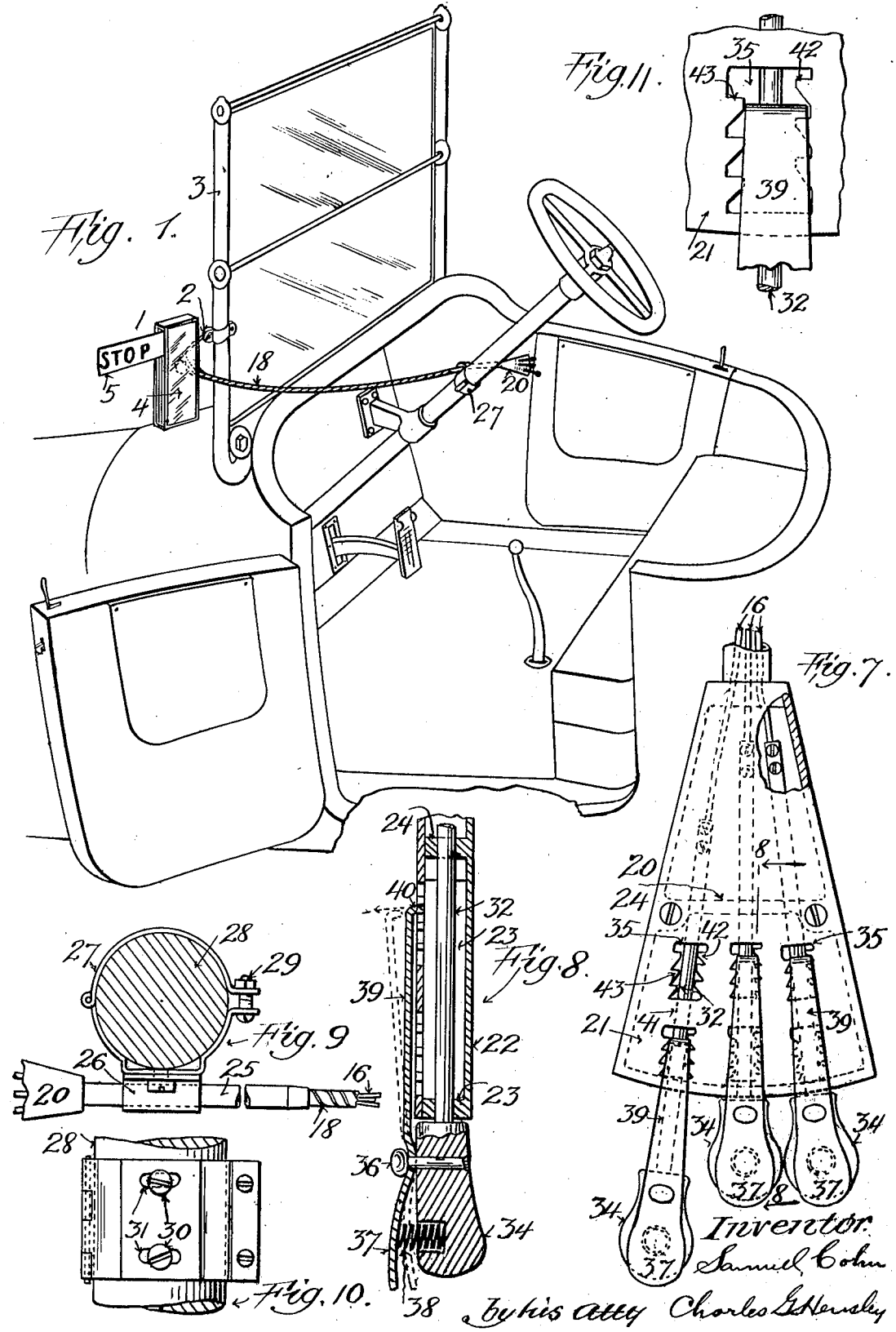

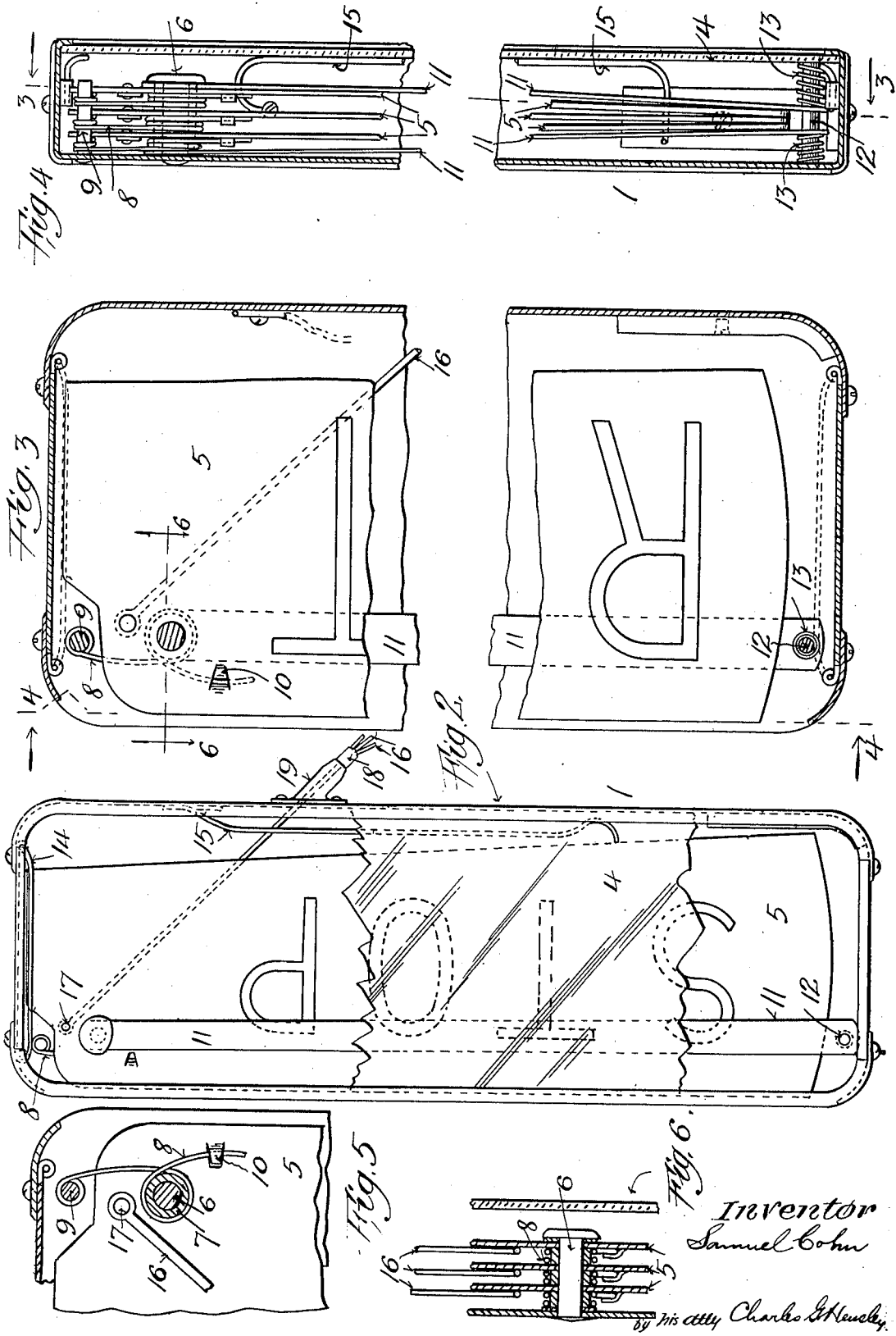

SAMUEL COHN, OF NEW YORK, N. Y., ASSIGNOR TO POLICE TRAFFIC AUTO SIGNAL COMPANY, A CORPORATION OF NEW YORK.

AUTOMOBILE-SIGNAL.

1,292,710.  Specification of Letters Patent.  Patented Jan. 28, 1919.

Application filed January 31, 1918. Serial No. 214,710.

*To all whom it may concern:*

Be it known that I, SAMUEL COHN, a citizen of the United States, and a resident of the borough of Bronx, city and State of New York, have invented certain new and useful Improvements in Automobile-Signals, of which the following is a specification.

My invention relates to automobile signals of the semaphore type in which signal plates or semaphores are operable from a convenient position within an automobile for the purpose of indicating to drivers to the rear of an intention of stopping or turning and for indicating to a traffic officer ahead. The object of my present invention is to provide a very simple, inexpensive and convenient signaling device of the character described, which can be made in large quantities and in one design and which will be readily adaptable to all makes of automobiles. My object is to provide a signal device which can be adapted to the various requirements of different automobiles so that the device may be readily attached by the user without modifying the structure of the device to accord with the particular positions and distances between the various parts of the automobile. The signal plates may be very easily operated, regardless of the relative positions of the controller box and the signal box and the signal plates will always be properly retracted or projected, as the case may be.

In the drawings forming part of this application,

Figure 1 is a perspective view of a portion of an automobile, showing my improved signal attached thereto, Fig. 2 is an elevation of the signal box with parts broken away to show the interior members, Fig. 3 is a sectional view taken on the line 3—3 of Fig. 4, Fig. 4 is a sectional view taken on the line 4—4 of Fig. 3, Fig. 5 is a sectional view showing the spring arrangement for retracting the signal plates, Fig. 6 is a sectional view showing similar parts, and which view is taken on the line 6—6 of Fig. 3, Fig. 7 is a plan view of the controller box and associated parts, Fig. 8 is a sectional view taken on the line 8—8 of Fig. 7, Fig. 9 is a detail view showing how the controller box is adjustably secured to the steering post, Fig. 10 is an elevation thereof, and Fig. 11 is an enlarged detail of the signal locking device.

The signal plates are arranged to be retracted in or projected from a suitable inclosure or box which latter is mounted on some part of the automobile where the signal plates may be seen by automobilists at the rear or by traffic officers ahead. I have shown a rectangular box 1 attached by a bracket 2 to the windshield frame 3 of an automobile, so that the box projects at one side of the automobile. The box 1 preferably has a mirror 4 in which the approach of other vehicles at the rear may be observed and the box forms a suitable inclosure for a number of signal plates 5, three such plates being shown herein.

These plates are mounted to swing from a stud 6 so that they may hang down within the box as shown in Fig. 3, or so that one or more may be projected into signaling position as shown in Fig. 1. The plates, it will be understood, may have suitable words of warning or indication on their faces. These plates are held in separated relation by sleeves 7 arranged on the stud 6 and between adjacent plates. There is a spring 8 for each plate looped around a sleeve 7 and having one end connected with a rod 9 and the other engaging a small lug 10 stamped up from the signal plate. When a signal plate is swung to signaling position its spring is placed under tension or under increased tension, so that upon release of the operating device the spring 8 will cause a quick return of the plate and will hold it in retracted position. I have shown anti-rattling plates or strips 11 connected at the top on the stud 6 and the lower ends being slidable sidewise along a pin 12. These plates 11 are disposed at opposite sides of the signal plates and they are pressed toward each other at their lower ends by coiled springs 13 arranged on the pin 12. These plates 11 prevent side swing of the signal plates and thus avoid rattling. This feature is not claimed herein as it forms the subject matter of my copending application Serial No. 198,439. I have arranged a spring 14 at the top of the box 1 and another 15 at the side, against which the signal plates strike when retracted, the purpose of which is to prevent the signal plates striking a hard blow against the box.

The box 1, being secured to some part of the automobile, such as the windshield frame, its location is more or less dependent upon the structure to which it is attached, and its position relatively to the controller box may be different in different automobiles.

There is a flexible member such as a wire 16 connected to each signal plate at 17 so that a drawing or pushing action on a wire will either raise or lower the particular signal plate to which it is connected. These several wires pass out of the box diagonally and they are inclosed in a flexible or pliable tube 18 which is fastened at one end to the box 1 by an attachment 19. The controller box is arranged on the opposite or free end of this tube 18.

The controller box 20 shown herein is flaring or fan shape, though the shape is not vital to any function of the device. Herein, the controller box consists of the front and back plates 21 and 22, the side plates 23 and a cross web or rib 24. There is also a tubular extension 25 fixed in relation to the controller box and the strap 26 surrounds this tubular extension and is itself secured to a clamp 27 which is adapted to surround the steering post 28 and to be secured thereon by the bolt 29. The screws 30 which secure the straps 26 to the clamp 27 are adjustable in the slots 31 so that the strap 26 together with the tubular extension 25 are adjustable in relation to the clamp 27.

This form of connection makes it possible to place the controller box in the most convenient position in relation to different steering wheels and still the adjustment in no way complicates the device nor does it require any variation in the remaining parts.

The controlling or operating wires 16 each extend through the flexible tube 18 and into the controller box 20 where each is connected with a rod or slider 32 which move in apertures in the web 24 and in the bottom wall 23 of the controller box. Outside the controller box each rod 32 is provided with an operating handle 34.

I have provided means for locking the rods 32, preferably at each end of their movement, i. e. when pushed in to retract the signals or when pulled out to throw up a signal. I have found, however, that where the operating wires 16 are arranged in the flexible tube 18 and where this tube is bent to adapt itself to the relative positions of the signal and controller boxes for different automobiles, that the relation between the signal plates and the controller rods varies according to the extent that the tube may be bent. If the rods 32 have but one unalterable in position and a similar out position, then if the tube 18 is bent out of a straight line the signal plates if properly arranged for a straight condition of the tube 18 will be drawn out of their intended position by the rods 32. To permit the rods 32 to be locked in varying positions to agree with different conditions caused by bending the tube 18 and so that the signal plates will always be retracted within the box 1 or be projected to the same position, as the case may be, I provide locking means adapted to lock the rods 32 at varying positions. The locking device is so constructed that a fine adjustment may be had without using too fine mechanism. For instance, the front 21 of the controller box has a slot 35 for each rod 32. On each handle 34 there is pivoted at 36 a locking lever having one end 37 overlying the handle 34 so as to be in convenient position to be actuated by the hand as the handle is grasped; and there is a spring 38 under this end 37 for returning the lever after each operation. The forward arm 39 of this lever has a turned down end or lug 40 which is adapted to enter one of the slots 35. Although it is not necessary to do so, I have divided the slots 35 into two parts separated by a cross piece 41 of the front 21 the upper part of each slot having means for locking the rods 32 when the signals are retracted and the lower part of each slot having means for locking the rods when the signals are projected. At opposite sides of each slot 35 I have arranged projections or teeth 42 and 43 with which the lugs 40 on the locking levers may engage. The teeth 42 are in alternate or staggered relation to the teeth 43. That is to say, from the extreme top of the slot 35 the first engaging or locking member is one of the teeth 42, and next in vertical position is one of the teeth 43, then one of the teeth 42 and so on. The teeth 43 are one half tooth length below the teeth 42. The width of the lug 40 is such that it can lie against the end of one of the teeth at one side of the slot 35 and within a notch at the opposite side.

If the signal box and controller box are so positioned that the tube 18 extends in a straight line between them then when the signals are retracted the lugs 40 will all engage in the extreme top of the slots 35 and they will rest against the upper tooth 42 so that the rods 32 and signal plates are all locked to prevent their accidental displacement and to prevent rattling. If, during the condition named, a signal plate is to be projected the corresponding lever arm 37 will be depressed to disengage the lug 40 from the locking means and the handle 34 will be drawn out, thus moving the corresponding rod 32, wire 16 and signal plate 5 and when the signal plate is fully raised and the lever arm 37 is released the lug 40 will engage in the extreme lower end of a slot 35 with the lowermost locking tooth 43.

If the tube 18, however, should be bent, as is very often the case, then the wires 16 will be taken up more or less thereby and the effect will be similar to shortening the wires. If the tube 18 is bent, therefore, the lug 40 may not enter the top of the slot 35 when the signal plate is retracted but, instead, it may enter ahead of the second, or third, or other tooth 42, 43 as the case may be, depending upon how much the tube 18 is bent. Also the lug 40 will not engage the lowermost tooth when the signal plate is fully projected but it may enter behind the second or third tooth from the bottom, etc., as the case may be. The multiple step locking device thus makes it possible to lock the actuating device in various positions so that the signal plates may be projected and retracted to the same positions regardless of whether the tube 18 and inclosed wires 16 are straight or curved. The locking is, at the same time, positive. By using offset or staggered locking members it is possible to secure finer adjustment with comparatively coarse or substantial locking members. The teeth shown herein may be comparatively coarse or strong so that the engagement therewith of the lugs 40 will be dependable and so that the teeth will not wear out after a brief period of use. But the locking adjustment herein shown is as fine as if a single set of teeth of one half of the size of those shown herein were used. I do not wish to be understood as limiting myself to the exact arrangement shown herein as the result may be obtained in any form wherein the finer adjustment may be obtained with comparatively coarse or more widely separated locking elements.

Having described my invention, what I claim is:

1. A device of the class described comprising a signal box, swinging signal plates therein adapted to be projected into signaling position, a flexible tube connected at one end to said signal box, flexible operating wires for said signal plates, disposed in said tube, a controller support on the opposite end of said tube, operating handles for said wires arranged on said support, and locking means for said wires associated with said support and comprising an actuating member and a plurality of engaging members arranged in staggered relation and with which said actuating member coöperates to lock said wires.

2. A device of the class described comprising a signal box, swinging signal plates therein adapted to be projected into signaling position, a flexible tube connected at one end to said signal box, flexible operating wires for said signal plates disposed in said tube, a controller box on the opposite end of said tube, operating handles for said wires arranged on said support, locking levers associated with said handles and having an engaging member, said controller box having a slot to receive the engaging member of said lever and teeth at opposite sides of said slot, arranged in staggered or offset relation and with which said engaging member is adapted to coöperate to lock said wires.

Signed at the city, county and State of New York, this 15th day of January, 1918.

SAMUEL COHN.